(12) United States Patent
Möhlmann et al.

(10) Patent No.: US 11,871,815 B2
(45) Date of Patent: Jan. 16, 2024

(54) METHOD FOR PRODUCING A SHOE WITH AN AIR PUMP DEVICE, COMPRISING A BELLOWS WHICH IS FORMED IN A MIDSOLE

(71) Applicant: ATMOS airwalk ag, Glattbrugg Zürich (CH)

(72) Inventors: Wilhelm Möhlmann, Glattbrugg Zürich (CH); Jens Schmidt, Obersimten Rheinland-Pfalz (DE)

(73) Assignee: ATMOS airwalk ag, Zürich (CH)

( * ) Notice: Subject to any disclaimer, the term of this patent is extended or adjusted under 35 U.S.C. 154(b) by 153 days.

(21) Appl. No.: 16/652,399

(22) PCT Filed: Sep. 3, 2018

(86) PCT No.: PCT/EP2018/073636
§ 371 (c)(1),
(2) Date: Mar. 30, 2020

(87) PCT Pub. No.: WO2019/068403
PCT Pub. Date: Apr. 11, 2019

(65) Prior Publication Data
US 2020/0281324 A1    Sep. 10, 2020

(30) Foreign Application Priority Data

Oct. 2, 2017 (EP) ..................... 17194421

(51) Int. Cl.
*A43D 29/00* (2006.01)
*B29D 35/00* (2010.01)
*B29D 35/14* (2010.01)

(52) U.S. Cl.
CPC ......... *A43D 29/00* (2013.01); *B29D 35/0009* (2013.01); *B29D 35/142* (2013.01)

(58) Field of Classification Search
CPC ... A43D 29/00; B29D 35/0009; B29D 35/142
(Continued)

(56) References Cited

U.S. PATENT DOCUMENTS 8,893,403 B2   11/2014   Möhlmann
9,510,642 B2   12/2016   Moretti
(Continued)

FOREIGN PATENT DOCUMENTS

CN   101695863 A    4/2010
CN   105163618 A    12/2015
(Continued)

OTHER PUBLICATIONS

Extended European Search Report issued in European Application No. 17194421.8, dated Feb. 27, 2018.
(Continued)

*Primary Examiner* — Alissa J Tompkins
*Assistant Examiner* — Catherine M Ferreira
(74) *Attorney, Agent, or Firm* — Parker Highlander PLLC

(57) ABSTRACT

The invention relates to a method for producing a shoe with an air pump device bellows which is arranged in the heel region, wherein an upper (2), a midsole (3), and an outsole (4) are first provided. The lower face (32) of the midsole (3) has a recess (36) for forming a cavity for the bellows and a surface which surrounds the recess on all sides and which comprises a surface profile, and the upper face (41) of the outsole (4) has a surface with a surface profile which complements the surface profile of the lower face of the midsole. The horizontal extension of the upper face (41) of the outsole (4) and of a sole section (22) of the upper (2) is greater than the horizontal extension of the midsole (3) such that the outsole (4) and the upper (2) protrude beyond the centered midsole (3) on all sides. In order to connect the upper (2), the midsole (3), and the outsole (4), the midsole
(Continued)

(3) is first adhered onto the sole section (22) in a centered manner, and the upper (2) together with the midsole (3) are pressed onto the outsole (4) which is provided in the base element (6) of an injection mold. In the process, the complementary surfaces are adhered such that the cavity of the recess (36) is completely enclosed. The upper (2), the midsole (3), and the outsole (4) are then enclosed by an injection mold, and the outsole (4) upper face (41) surface regions which are not covered by the midsole (3), the outer surfaces of the midsole (3), and the lower face and adjacent lateral surface regions of the upper (2) are overmolded with an edge sole region plastic.

34 Claims, 10 Drawing Sheets

(58) Field of Classification Search
USPC .......................................................... 12/18.1
See application file for complete search history.

(56) References Cited

U.S. PATENT DOCUMENTS

| | | | |
|---|---|---|---|
| 2012/0297644 A1 | 11/2012 | Polegato Moretti | |
| 2014/0013632 A1* | 1/2014 | Mohlmann | A43B 7/06 36/25 R |
| 2016/0029740 A1* | 2/2016 | Mohlmann | A43B 7/08 36/3 B |

FOREIGN PATENT DOCUMENTS

| | | |
|---|---|---|
| EA | 026469 B1 | 1/2013 |
| EP | 1 857 001 | 11/2007 |
| EP | 2 298 099 | 3/2011 |
| EP | 2 901 879 | 8/2015 |
| EP | 2 901 879 A1 | 8/2015 |
| RU | 2552 092 C2 | 4/2015 |
| WO | WO 2001/082732 | 11/2001 |

OTHER PUBLICATIONS

Office Action issued in European Application No. 17194421.8, dated Mar. 26, 2020.
Office Action issued in European Application No. 17194421.8, dated Jun. 9, 2020.
PCT International Preliminary Report on Patentability issued in International Application No. PCT/EP2018/073636, dated Apr. 16, 2020.
PCT International Search Report and Written Opinion issued in International Application No. PCT/EP2018/073636, dated Oct. 29, 2018.
Office Action issued in Chinese Application No. 111182811A, dated Feb. 26, 2021 (English summary appended).

* cited by examiner

METHOD FOR PRODUCING A SHOE WITH AN AIR PUMP DEVICE, COMPRISING A BELLOWS WHICH IS FORMED IN A MIDSOLE

This application is a national phase application under 35 U.S.C. § 371 of International Application No. PCT/EP2018/073636, filed Sep. 3, 2018, which claims benefit of European Application No. 17194421.8, filed Oct. 2, 2017, the entire contents of each of which are hereby incorporated by reference.

The invention relates to a method for producing a shoe with an air pump device arranged in the heel region comprising at least one bellows, into which at least one air intake duct opens and to which at least one air-guiding duct which opens into the interior of the shoe is connected, an upper having an upper material section and a sole section having a lower face, a midsole having an upper face and a lower face, and an outsole having an upper face being provided, wherein the midsole comprises a recess for forming at least one cavity for the at least one bellows of the air pump device, wherein the upper, the midsole, and the outsole being interconnected by first either the lower face of the sole section of the upper being connected to the upper face of the midsole and then the combination of the upper and midsole being connected to the outsole or first by the lower face of the midsole being connected to the upper face of the outsole and then the combination of the midsole and outsole being connected to the upper.

From the earlier applications EP 2 218 348 A1, WO 2012/126489 A1 and EP 3 078 288 A1, various designs of shoes are known which comprise an air pump device comprising at least one bellows arranged in the heel region of the shoe and in which an air intake duct opens into the bellows and at least one air duct opening into the interior of the shoe is connected to the bellows. In an embodiment described in EP 2 218 348 A1, a midsole made of a compressible material is arranged between a hard outsole and a harder sock, it being possible for a cavity for receiving a bellows of the air pump device to be embedded in the midsole in the heel region. WO 2012/126489 A1 discloses a shoe comprising an air pump device in a sole construction, in which the sole construction comprises a lower outsole part and an upper sole part, the bellows of the air pump device substantially being formed in the upper sole part in a cavity that is delimited at the top and sides by the upper sole part and at the bottom by the outsole part. The sole construction described is intended to be produced from a resilient material by plastics injection molding, for example.

EP 3 078 288 A1 discloses a method for producing a shoe comprising an air pump device, in which a pre-assembled upper having a perforated insole, various components of an air pump device (namely bellows, air intake duct and air ducts comprising one-way valves) and a one-piece sole construction are provided and the upper is then connected to the one-piece sole construction such that (for example by bonding) the components of the air pump device are positioned in cut-outs in the one-piece sole construction between this sole construction and the insole. In one described embodiment, the one-piece sole construction is intended to be injection molded onto the lower face of the insole, to which the components of the air pump device have previously been attached. A drawback here is the manufacturing complexity, in particular the complexity required in order to avoid compression of the cavities receiving the components of the air pump device on account of the injection pressure.

Proceeding from this prior art, the problem addressed by the invention is to provide a cost-effective production method which, on one hand, utilizes the advantages of connecting the sole construction to the upper by means of injection molding technology, but on the other hand enables the air pump device to be inserted without considerable additional complexity.

This problem is solved according to the invention by a method having the features of claim 1. In this method for producing a shoe comprising an air pump device arranged in the heel region comprising at least one bellows, into which at least one air intake duct opens and to which at least one air-guiding duct which opens into the interior of the shoe is connected, an upper having an upper material section and a sole section having a lower face, a midsole having an upper face and a lower face, and an outsole having an upper face are provided, wherein either the lower face of the midsole has a surface having a first surface profile and at least one recess adjacent to this surface for forming at least one cavity for the at least one bellows of the air pump device, and the upper face of the outsole has a surface having a second surface profile which is complementary to the first surface profile at least in part such that the complementary surface regions of the second surface profile of the outsole and the first surface profile of the midsole surround the at least one recess on all sides, or the upper face of the midsole has a surface having a first surface profile and at least one recess adjacent to this surface for forming at least one cavity for the at least one bellows of the air pump device, and the lower face of the sole section of the upper has a surface having a second surface profile which is complementary to the first surface profile at least in part such that the complementary surface regions of the second surface profile of the sole section and the first surface profile of the midsole surround the at least one recess on all sides, wherein the horizontal extension of the upper face of the outsole and the horizontal extension of the sole section of the upper are greater than the horizontal extension of the midsole such that the midsole can be positioned so as to be centered between the outsole and the upper such that the outsole and the upper protrude beyond the outer edge of the midsole on all sides. To connect the upper, the midsole and the outsole, first either the midsole is applied in a centered manner to the lower face of the sole section of the upper and the upper having the applied midsole is pressed onto the upper face of the outsole, the outsole previously being provided in a base element of an injection mold, or the midsole is applied in a centered manner to the upper face of the outsole and the outsole having the applied midsole is applied to the lower face of the upper. Here, the complementary surface regions of the first surface profile of the upper face or the lower face of the midsole and the second surface profile of the lower face of the sole section or the upper face of the outsole are adhered such that the at least one cavity of the at least one recess is completely enclosed. Then, the upper, the midsole and the outsole are enclosed by an injection mold and the surface regions of the upper face of the outsole not covered by the midsole, the lateral outer surfaces of the midsole and the lower face and adjacent lateral surface regions of the upper are overmolded with an edge sole region plastic in order to interconnect the outsole, the midsole and the upper by forming an edge sole region.

A "bellows" is to be understood here to mean an air-admitting, resiliently compressible cavity enclosed by walls, which, when compressed, ejects air via a coupled air-guiding duct and which, when subsequently expanded, suctions in air via an air intake duct. The walls surrounding the cavity of the bellows could be formed by the walls of a plastics bubble inserted in the recess, but are preferably formed by the walls of the recess in the midsole delimiting the cavity and either the lower face of the sole section of the upper covering the recess or the upper face of the outsole itself covering the recess. The "sole section" of the upper represents the part of the upper facing the outsole, which preferably comprises an insole or consists of the insole. The terms upper face and lower face refer to the position of the sides described as such in the normal wearing position of the shoe. If it is said that the first surface profile and the second surface profile are complementary at least "in part," this means that the two surface profiles are complementary at least in portions of their total surface arranged opposite one another, such that they lie against one another over the entire surface in these portions. If, based on this understanding, it is further specified that the complementary surface regions "surround the at least one recess on all sides," this means that the portions lying against one another surround this recess or recesses such that the cavity of the recess or recesses is completely enclosed by the walls of the components of the shoe having the complementary surface regions (either midsole and outsole or midsole and sole section of the upper). One exception to this is the openings in the bellows to the air intake duct and air-guiding duct.

The method according to the invention, in which the shoe is produced from three prefabricated sole components which are overmolded for connection to a fourth component, has several advantages. The formation of the bellows cavity in the air pump device by means of a recess in a prefabricated midsole that is open on one side simplifies the production of the air pump device. Closing the cavity formed by the recess by means of a second sole component adhered to complementary surfaces before the overmolding enables the cavity in the air pump device to be protected in an easy-to-produce manner against undesired compression by the injection pressure during the overmolding and against penetration of the plastics material, which is still liquid. The method according to the invention provides a simple design of the components of the air pump device and prefabrication and pre-assembly of these components in the sole components. It also allows suitable sole materials to be selected for the sole components depending on their respective functions.

The injection pressure in step b) is preferably selected depending on the material of the midsole such that the at least one cavity of the at least one recess is not compressed or only slightly compressed.

In a preferred embodiment, in step a1-1) or in step a2-2), the upper is positioned on a last such that the lower face of the sole section points upwards. This simplifies an operator's control of the correct positioning of the midsole on the lower face of the sole section.

In a preferred development of the method, in step a1-1) or in step a2-1), the midsole is applied in a centered manner by it being positioned using markings or projections on the lower face of the sole section of the upper or on the upper face of the outsole. This serves to facilitate the correct positioning of the midsole.

A preferred variant of the method is characterized in that an upper is provided which has a first air intake duct extending from the sole section along its upper material section comprising an air intake opening spaced apart from the sole section and a first connecting element arranged on the sole section; a midsole is provided which has, on its upper face, a second connecting element connected to a second air intake duct of the air pump device; and steps a1-1) and a1-2) are carried out, wherein, in step a1-1), the first and the second connecting element are interconnected in order to connect the second air intake duct of the midsole to the first air intake duct of the upper. This separation of the components of the air intake duct and their pre-assembly on the upper and the midsole allows for simplified handling and more rapid assembly when connecting the components of the shoe. In this case, an upper is preferably provided which has a first air intake duct extending along its heel region.

A first embodiment of the method is characterized in that the upper face of the midsole comprises the surface having the first surface profile and the lower face of the sole section of the upper comprises the surface having the second surface profile, such that the complementary surface regions of the first surface profile of the upper face of the midsole and the second surface profile of the lower face of the sole section are adhered in step a1-1). In this embodiment, the at least one recess in the midsole is thus open towards the sole section of the upper, i.e. open on the upper face of the midsole.

In this first embodiment of the method, the sole section of the upper may preferably comprise an insole which is reinforced in the heel region above the at least one recess containing the at least one bellows of the air pump device and is designed as a rigid pressure plate which covers the at least one recess. This improves the compression of the cavity formed by the recess.

A second embodiment of the method is characterized in that the lower face of the midsole comprises the surface having the first surface profile and the upper face of the outsole comprises the surface having the second surface profile, such that the complementary surface regions of the first surface profile of the lower face of the midsole and the second surface profile of the upper face of the outsole are adhered in step a1-2) when the upper having the applied midsole is pressed onto the upper face of the outsole. In this embodiment, the at least one recess in the midsole is thus open towards the outsole, i.e. open on the lower face of the midsole.

In this second embodiment of the method, in step a1-1), the midsole may be adhered to the lower face of the sole section of the upper. Since, in this embodiment, the recess is open towards the outsole, when adhering the midsole to the lower face of the sole section of the upper, it is not important that the entire surface is adhered or that the surfaces adhered to one another have complementary profiles. This adhesion only serves to fix the midsole to the upper before overmolding. However, it is important here to ensure that the midsole is correctly positioned on the lower face of the sole section of the upper, so that, in step a1-2), the midsole fastened to the upper can then be correctly positioned on the outsole with the at least one downwardly open recess such that the complementary surface regions of the second surface profile of the outsole and the first surface profile of the midsole lie on one another.

The outsole is preferably provided in the base element of the injection mold by the outsole being produced in the base element by injection molding or casting. Part of the same device can thus be used in prefabricating the outsole.

In a preferred embodiment of the method, an outsole is provided which projects beyond the outer edge of the midsole on all sides such that the distance between the outer edge of the outsole and the outer edge of the midsole is between 5% and 20% of the length of the shoe. This range is optimal when contradicting requirements are to be met, namely both the requirement for a maximum horizontal expansion of the recess and thus the midsole, which allows for a maximum pump volume, and the requirement for the widest possible edge sole region to achieve a stable and permanent connection between the outsole and the upper.

A preferred development of the method is characterized in that a midsole is provided which consists of a plastics foam having a Shore A hardness of between 40 and 60 Shore. It has been shown that, when adhering to this hardness range, sufficient compressibility can be achieved both to obtain the most complete possible compression of the pump volume each time the user takes a step, and to obtain sufficient dimensional stability when the injection pressure is applied during the overmolding with the edge sole region plastic.

In a preferred embodiment, a midsole is provided comprising a recess arranged in the heel region for receiving a bellows of the air pump device, wherein the recess extends horizontally laterally and extends, at the back of the shoe, by a distance of approximately 1-5% of the length of the shoe from the edge of the midsole, wherein the bellows is formed by the recess that is covered by the lower face of the sole section or the upper face of the outsole and wherein a section of the at least one air intake duct and a section of the at least one air-guiding duct opening into the interior of the shoe are formed in the midsole. In this preferred embodiment, a maximum pump volume is achieved with sufficient resilience when pressure is relieved by lifting up the shoe after each step is taken.

Advantageous and/or preferred embodiments of the invention are found in the dependent claims.

The invention is explained in greater detail in the following on the basis of preferred embodiments shown in the drawings, in which.

A first embodiment of the method according to the invention for producing a shoe comprising an air pump device arranged in the heel region is to be described with reference to FIGS. 1 to 4B.

Figure 1:
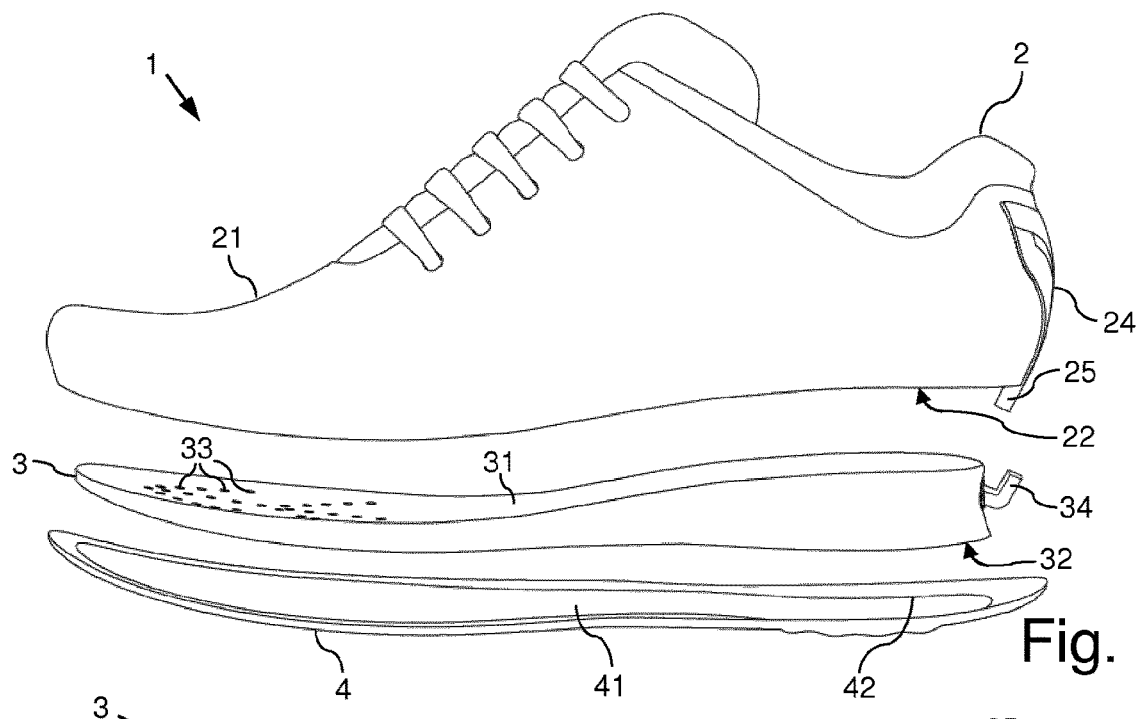
FIG. 1 is a side view of the upper, midsole and outsole components of a shoe to be produced according to a first preferred embodiment of the method according to the invention.

FIG. 1 is a schematic side view of three basic components from which a shoe 1 is manufactured, namely an upper 2, a midsole 3 and an outsole 4.

The upper 2 comprises an upper material section 21 and a sole section 22. The sole section 22 is to be understood here to mean the part of the upper which faces the ground and to which the sole construction described below is attached. The upper material section 21 is then the remaining part of the upper 2. The sole section 22 usually comprises an insole and can also include further sole layers, for example soles inserted in the interior. In some embodiments, a separate insole can also be omitted and, for example, the leather of the upper can be guided around the foot from the upper material section downwards, as is the case with a moccasin, for example.

Figure 2:
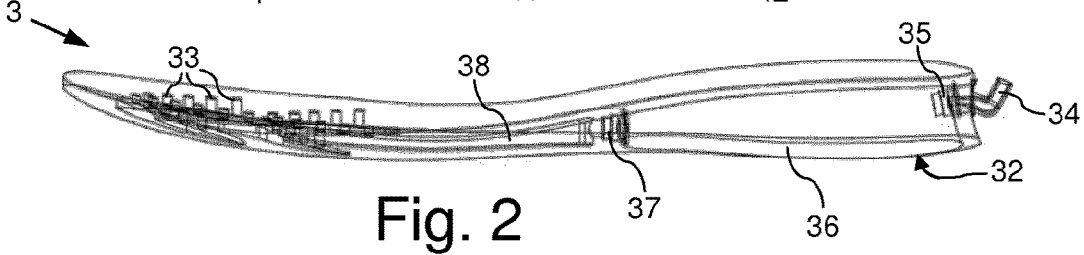
FIG. 2 is a view of the midsole according to FIG. 1, in which the inner boundary lines which are not visible from the outside are made visible.

The midsole 3 is preferably produced in one piece from a compressible plastics material and contains, on its lower face 32, a recess 36 which can be seen in a separate view of the midsole 3 in FIG. 2, in which the inner edges which are not visible from the outside are made visible. The midsole 3 shown in FIGS. 1 and 2 also contains air-guiding ducts 38 which lead from the recess 36 to openings 33 on the upper face 31 of the midsole 3. These air-guiding ducts 38 are connected to the cavity of the recess 36 via a one-way valve 37 such that when the cavity is compressed, the air contained therein can only escape through the one-way valve 37 in the direction of the air-guiding ducts 38. Furthermore, the midsole 3 contains an air intake duct which is adjacent to the recess 36 at the rear of the shoe and which is likewise connected to the cavity of the recess 36 via a one-way valve 35. This one-way valve 35 is designed such that it only lets the air through in the direction into the cavity of the recess 36. The other end of the air intake duct comprises a connecting element 34.

The sole section 22 (not shown in detail here) contains openings in the forefoot region which extend from its lower face as far as the interior of the shoe 1 and are arranged such that they are aligned with the openings 33 on the upper face 31 of the midsole 3. Air which is pressed from the recess 36 into the air-guiding ducts 38 and then through the openings 33 thereof via the one-way valve 37 thus enters the interior of the shoe 1 through the openings in the sole section 22 of the upper. The upper also contains an air intake duct 24 comprising a connecting element 25 which is connected to the connecting element 34 of the air intake duct of the midsole 3 when the midsole 3 is attached to the upper 2. At its upper end, the air intake duct 24 contains an air intake opening (not shown in detail here), which is preferably covered with a grid or a coarse-mesh fabric. The air intake duct 24, on the back of the upper 2, may also be designed (for example in a meandering shape) such that the air is deflected into its flow direction when it is suctioned in before it is guided downwards into the midsole. This deflection of the suctioned-in air flow can be used to separate water droplets and/or dirt particles contained in the air. The air intake duct 24 can also comprise a plurality of air intake ducts that are guided in parallel. In the embodiment shown in FIG. 1, the air intake duct 24 is formed on the back of the upper 2. In alternative embodiments, it can also be formed on the inside or outside of the upper 2.

A third shoe component shown in FIG. 1 is the outsole 4, which, on its upper face 41, has an indentation, shown here by the edge 42, into which the midsole 3 can be fitted. Here, the indentation makes it easier to position the midsole 3 relative to the outsole 4. The material of the outsole 4 is preferably also a plastics or rubber material which is adapted to the requirements of an outsole 4, in particular has high abrasion resistance.

Figure 3A:
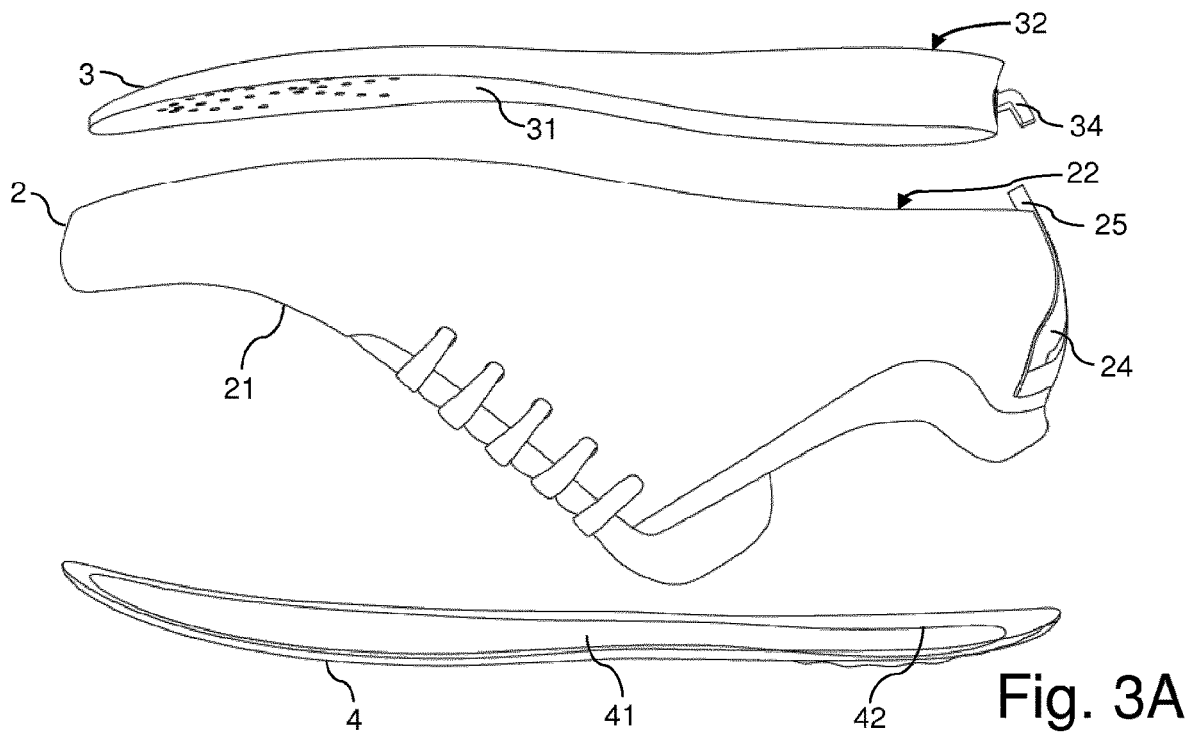
FIG. 3A to 3E are side views of the components and the shoe according to FIG. 1 in the various phases of production according to the first preferred method.
Figure 3B:
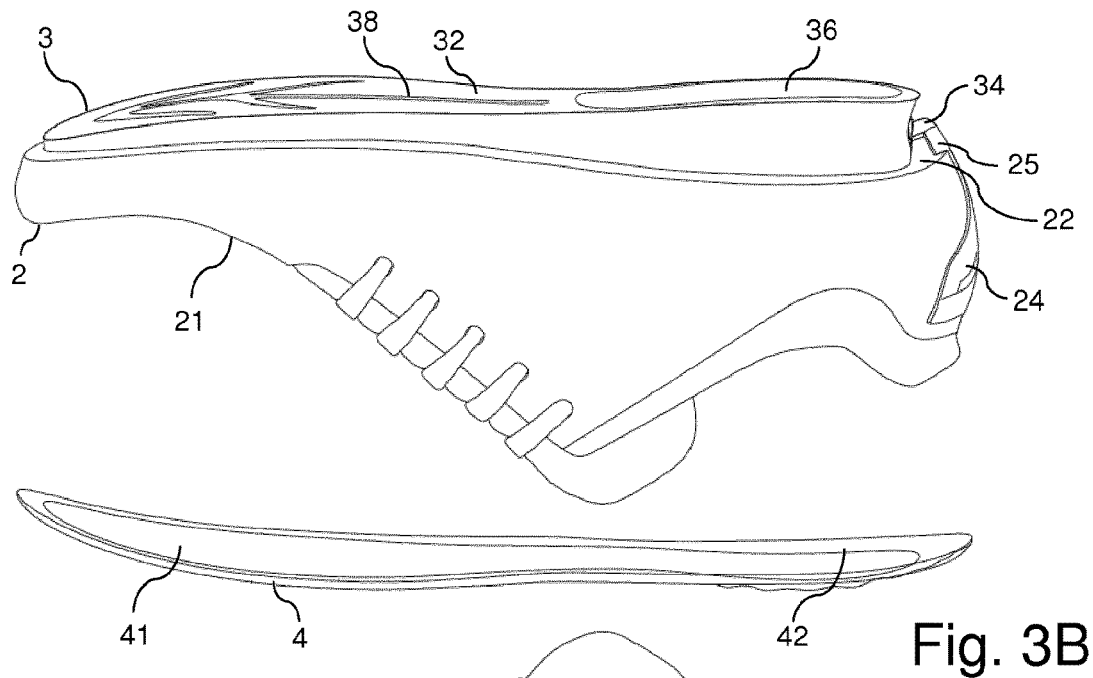

FIG. 3A to 3E show a first preferred embodiment of a method for producing the shoe 1 from the three shoe components, the upper 2, midsole 3 and outsole 4. In the preferred procedure according to FIG. 3A, the upper 2 is positioned on a last (not shown here) such that its lower face, i.e. the sole section 22, points upwards. Then the midsole 3 is placed from above onto the sole section 22 of the upper 2 and positioned in the process, the connecting elements 34 and 25 of the air intake duct being interconnected. The result is shown in FIG. 3B. The lower face 32 of the midsole 3 points upwards here, such that, here, both the recess 36 and recesses of the air-guiding ducts 38 can be seen. The upper face 31 of the midsole 3 is preferably adhered to the sole section 22. A full-surface adhesive connection is not necessary here; during adhesion, it is merely necessary both to ensure correct positioning of the midsole and to keep the connecting ducts between the openings 33 and the interior of the shoe 1 free. Either before the midsole is attached to the upper 2 or thereafter, the outsole 4 is placed, in the orientation shown in FIG. 3B, into a base element (not shown here) of an injection mold, in which the outsole 4 is supported on its lower face over the entire surface thereof.

Figure 3C:
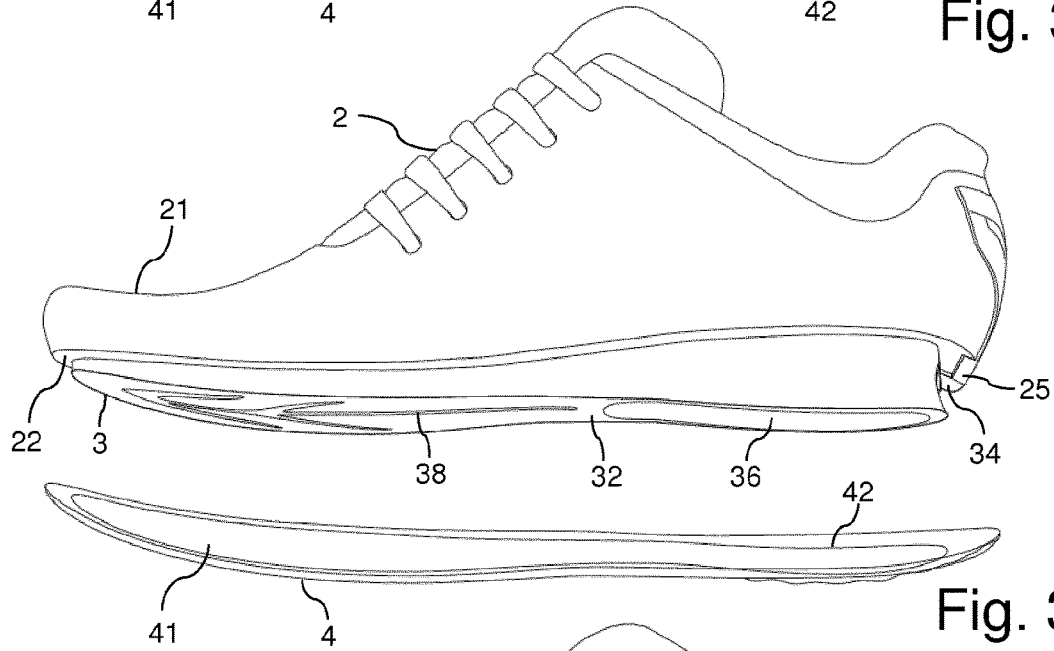

As can be seen in FIG. 3C, the upper 2 having the midsole 3 attached thereto is rotated such that the lower face 32 of the midsole 3 faces the upper face 41 of the outsole 4. The upper 2 having the midsole 3 is then moved downwards such that the midsole 3 is positioned in the indentation by means of the edge 42 and is pressed against the upper face 41 of the outsole 4. The upper face 41 of the outsole 4 closes the recess 36 and the recesses in the air-guiding ducts 38. For this purpose, at least the region of the surface of the lower face 32 of the midsole 3, which surrounds the recess 36 and the recesses of the air-guiding ducts 38, is complementary to the opposite surface of the upper face 41 of the outsole 4, such that the cavity of the recess 36 and the cavities of the recesses of the air-guiding ducts 38 are sealed on all sides when the lower face 32 of the midsole 3 is pressed onto the upper face 41 of the outsole 4. Before the lower face 32 of the midsole 3 is pressed onto the upper face 41 of the outsole 4, the lower face 32 and/or the upper face 41 is coated with adhesive within the indentation. The adhesive bond between the lower face 32 of the midsole 3 and the upper face 41 of the outsole 4 completely surrounds the recess 36 and the recesses of the air-guiding ducts 38, such that no gap remains between the midsole 3 and the outsole 4 which connects the recess 36 or the air-guiding ducts 38 to the environment.

Figure 3D:
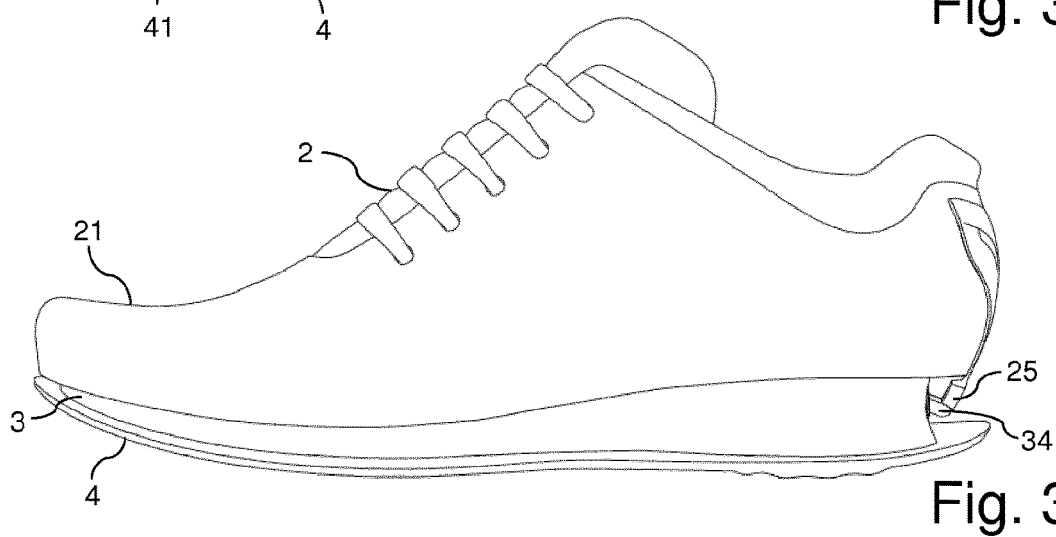
Figure 3E:
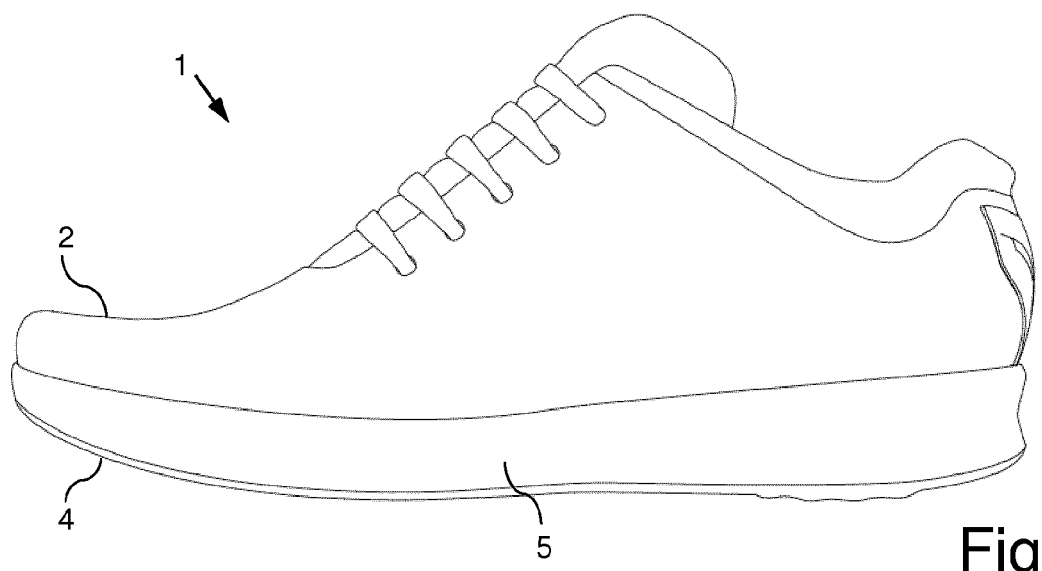

The result after connecting the midsole 3 to the outsole 4 is shown in FIG. 3D. Both the outer edge of the outsole 4 and the sole section of the upper 2 protrude beyond the outer edge of the midsole 3 such that the distance between the outer edge of the outsole and the outer edge of the midsole is between approximately 5% and 20% of the length of the shoe, for example approximately 10 to 20 mm. The arrangement shown in FIG. 3D is then enclosed by an injection mold and the surface regions of the upper face 41 of the outsole 4 that are not covered by the midsole 3, the lateral outer surfaces of the midsole 3 and the surfaces of the sole region 22 that are not covered by the midsole 3 and adjacent lateral surface regions of the upper 2 are overmolded with an edge sole region plastic such that the outsole 4, the midsole 3 and the upper 2 are firmly interconnected. The result is shown in FIG. 3E.

Figure 4A:
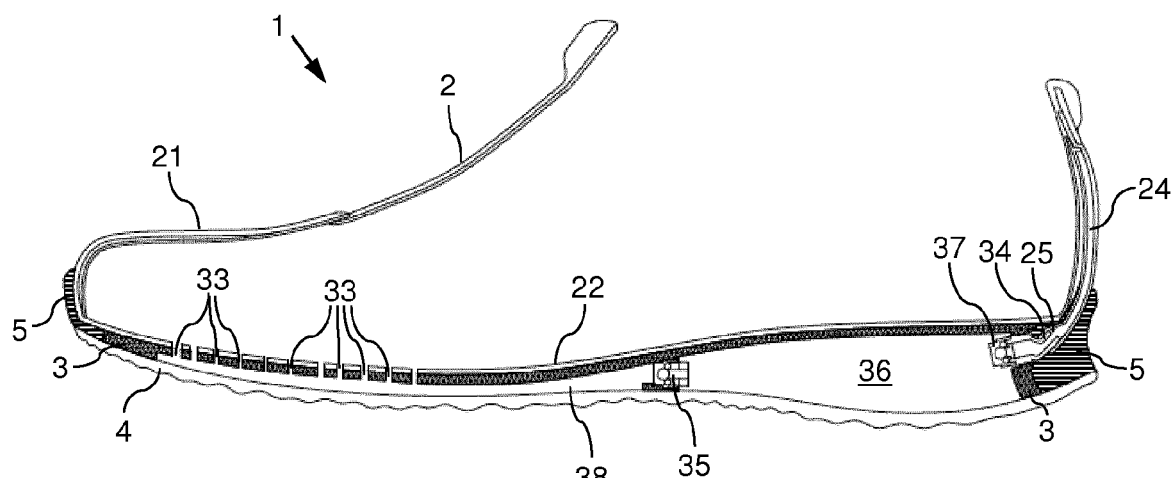
FIG. 4A is a longitudinal sectional view and FIG. 4B is a cross-sectional view of a shoe produced according to the first preferred method shown in FIG. 3A to 3E.
Figure 4B:
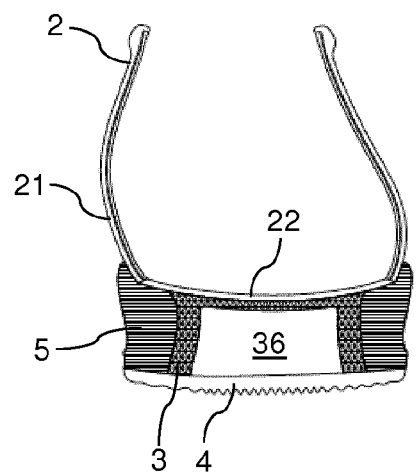

FIGS. 4A and 4B are schematic sectional views through the shoe 1 produced in the manner described above. FIG. 4A is a longitudinal sectional view which extends approximately centrally through the shoe. It shows the upper 2 having the upper material section 21 and the sole section 22 and the midsole 3 having the downwardly open recess 36, the downwardly open recesses for the air-guiding ducts 38, the openings 33, the one-way valve 35 connecting the recess 36 to the air-guiding ducts 38, and the air intake duct that comprises the connecting element 34 and is also connected to the recess 36 via a one-way valve 37. The intake duct 24 together with its connecting element 25, which are part of the upper 2, are also visible. At the front and the back of the shoe 1, parts of the edge sole region 5, which connects the outsole 4 to the midsole 3 and the upper 2, are visible in horizontal hatching. FIG. 4B is a sectional view through the heel region of the shoe 1 transversely to the direction of movement, the midsole 3 having the recess 36, which is closed by the outsole 4, the upper 2 having the upper material section 21 and the sole section 22, and the edge sole region 5 also being shown here.

With reference to FIG. 4A, the operating principle of the air pump device, which is known as such, will be briefly discussed. The downwardly open recess 36 in the midsole 3, which is closed at the bottom by the outsole 4, forms a cavity in the compressible midsole 3. If the weight of the wearer of the shoe 1 presses on the heel region while walking, the cavity of the recess 36 is compressed by the midsole 3 being pressed together. The air contained in the cavity of the recess 36 is pressed through the one-way valve 35 while the one-way valve 37 closes. The air pressed through the one-way valve 35 passes into the interior of the shoe 1 in its toe or ball region via the air-guiding ducts 38 through the openings 33 and the corresponding openings in the sole section 22. When the wearer of the shoe 1 then relieves the pressure of the foot and lifts the shoe 1 off the ground, the resilient restoring forces of the material of the compressed midsole 3 and the material of the compressed edge sole region 5 cause the cavity of the recess 36 to expand. Owing to the resulting negative pressure in the cavity of the recess 36, the one-way valve 35 closes while the one-way valve 37 opens. Fresh air is thereby suctioned in via the air intake duct 24 from an intake opening (not shown in FIG. 4A) at the upper end of the air intake duct 24 and is conducted into the cavity of the recess 36. When the wearer of the shoe 1 takes the next step, in which the wearer of the shoe 1 loads the heel again, the described process begins again. In each step, fresh air is suctioned in and then pumped into the interior of the shoe.

The plastics material of the edge sole region 5 is selected such that it adheres well to the surfaces of the upper 2, the midsole 3 and the upper face of the outsole 4. Furthermore, the edge sole region plastic has good compressibility in the hardened state, the compressibility being selected in conjunction with the compressibility of the midsole 3 such that when the wearer of the shoe 1 takes normal steps during the walking process, the cavity of the recess 36 is compressed as completely as possible. In addition, the plastics material of the edge sole region 5 is selected such that the resilience is sufficient to restore the shape of the midsole 3 as completely as possible, i.e. to expand the cavity of the recess 36 as completely as possible, within the short period of pressure relief of the foot during a step.

Figure 5:
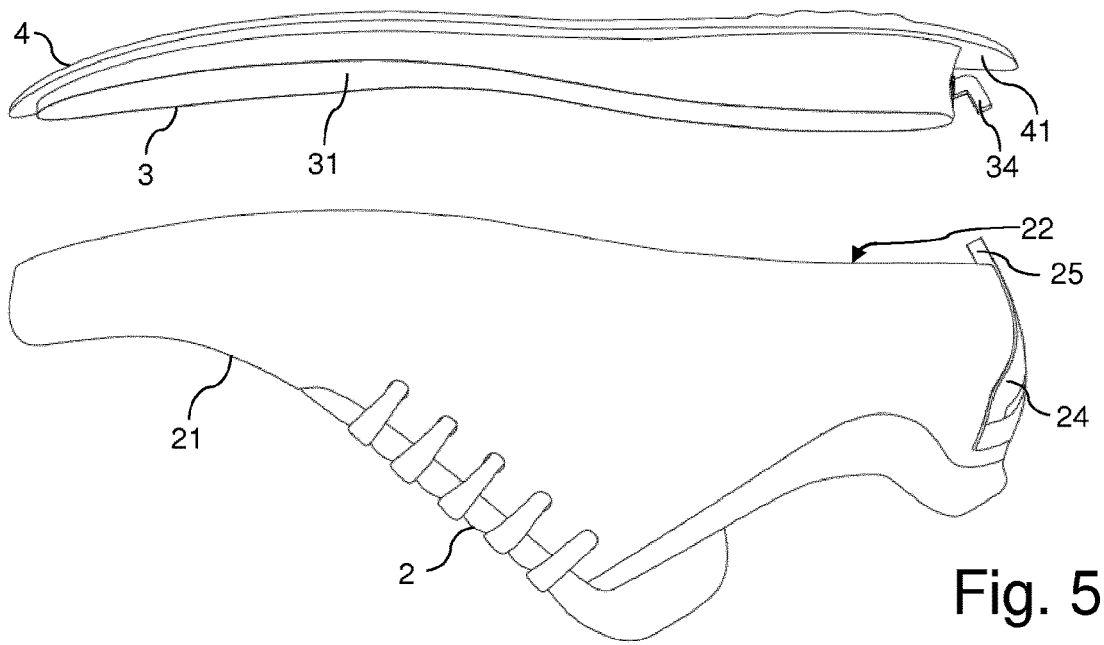
FIG. 5 shows a side view of the upper, midsole and outsole components in the production phase after the midsole and outsole have been connected and before the midsole has been connected to the upper of a shoe produced according to an alternative variant of the first preferred method.

FIG. 5 shows a phase of the production of a shoe according to a modification of the production method shown in FIG. 3A to 3E. It can be seen in FIG. 5 that a midsole 3 that is already applied to the upper face of the outsole 4 is arranged above an upper 2, the lower face of the sole section 22 of the upper 2 pointing upwards. In this embodiment of the method according to the invention, first the outsole 4 is provided in a mold, then the midsole 3 is adhered to the upper face 41 of the outsole 4 by its recess 36 which is open towards the outsole, such that the cavity of the recess 36 is enclosed on all sides. This combination of outsole 4 and midsole 3 is then attached to the lower face of the sole section 22, an arrangement preferably being selected in which, as shown in FIG. 5, the upper 2 clamped to a last points upwards with its lower face, in order to facilitate the application of the combination of midsole 3 and outsole 4 to the upper 2. While fastening this combination of midsole 3 and outsole 4 to the upper 2, a connection is also made between the connecting element 34 and the connecting element 25 of the air intake duct.

An alternative embodiment of the method according to the invention for producing a shoe comprising an air pump device arranged in the heel region is to be described with reference to FIGS. 6 to 9B. In this embodiment, a midsole 3' is used in which the recess 36' is arranged on the upper face of the midsole 3' and is thus open towards the sole section 22 of the upper 2.

Figure 6:
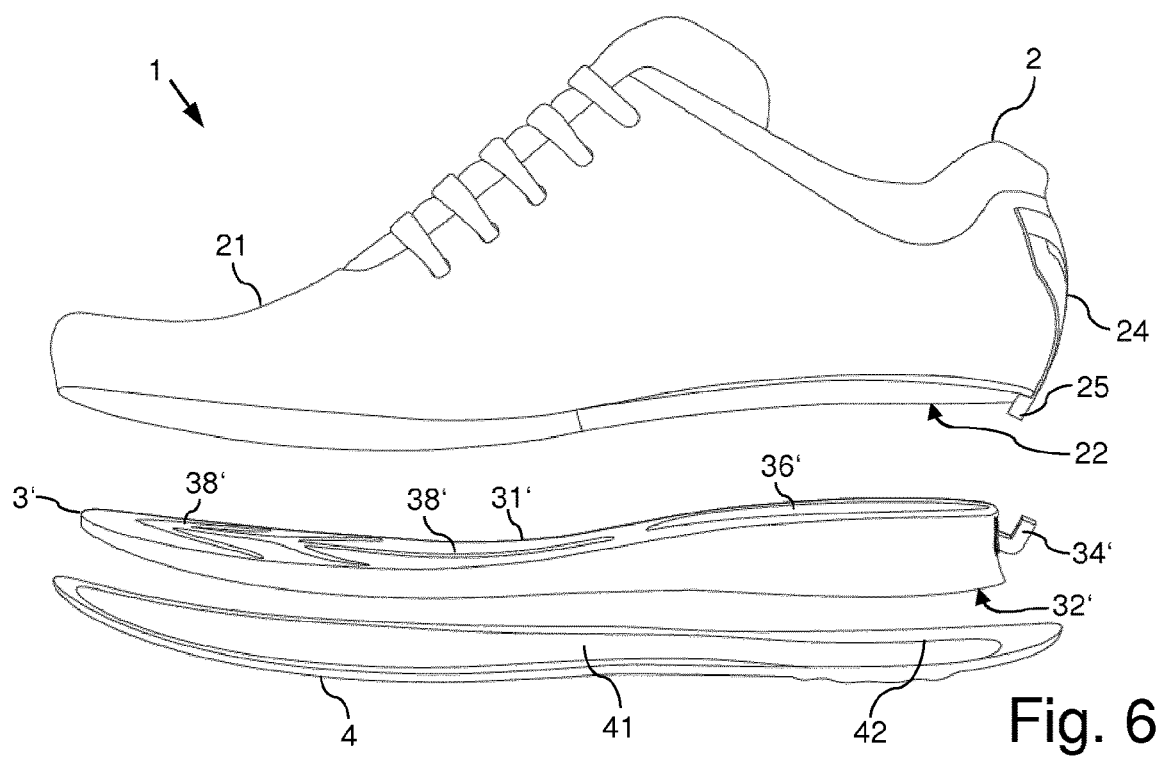
FIG. 6 is a side view of the upper, midsole and outsole components of a shoe to be produced according to a second preferred embodiment of the method according to the invention.
Figure 7:
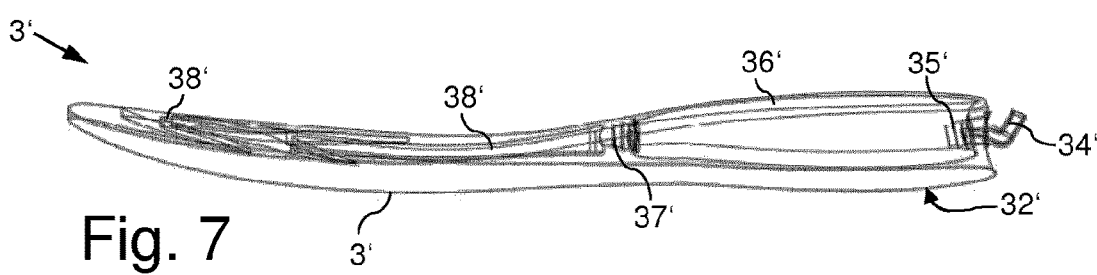
FIG. 7 is a view of the midsole according to FIG. 6, in which the inner boundary lines which are not visible from the outside are made visible.

FIG. 6 is a schematic side view of the three shoe components upper 2, midsole 3' and outsole 4 that are to be connected. FIG. 7 is a view of the midsole 3' according to FIG. 6, in which the inner edges and boundary lines not visible from the outside are made visible. The views in FIGS. 6 and 7 correspond to the views in FIGS. 1 and 2 of the first-mentioned, preferred embodiment of the method according to the invention, the same elements being provided with the same reference signs. With these same elements, reference can be made to the description of FIGS. 1 and 2. Differences arise in particular on account of the differing design of the midsole 3'. This midsole 3' has a recess 36' adjacent to the upper face 31' for receiving a bellows of the air pump device. This bellows of the air pump device is preferably not a separate component, but rather is formed by the cavity of the recess 36' itself. In a less preferred embodiment, a separate component, in particular a plastics bubble enclosing a cavity, can also be introduced into the recess 36' as a bellows. Further recesses adjacent to the upper face 31' of the midsole 3' form air-guiding ducts 38'. The sole section 22 of the upper 2 in turn has openings which connect the interior of the shoe 1 to the air-guiding ducts 38' after the midsole 3' has been attached to the lower face of the upper 2.

Figure 8A:
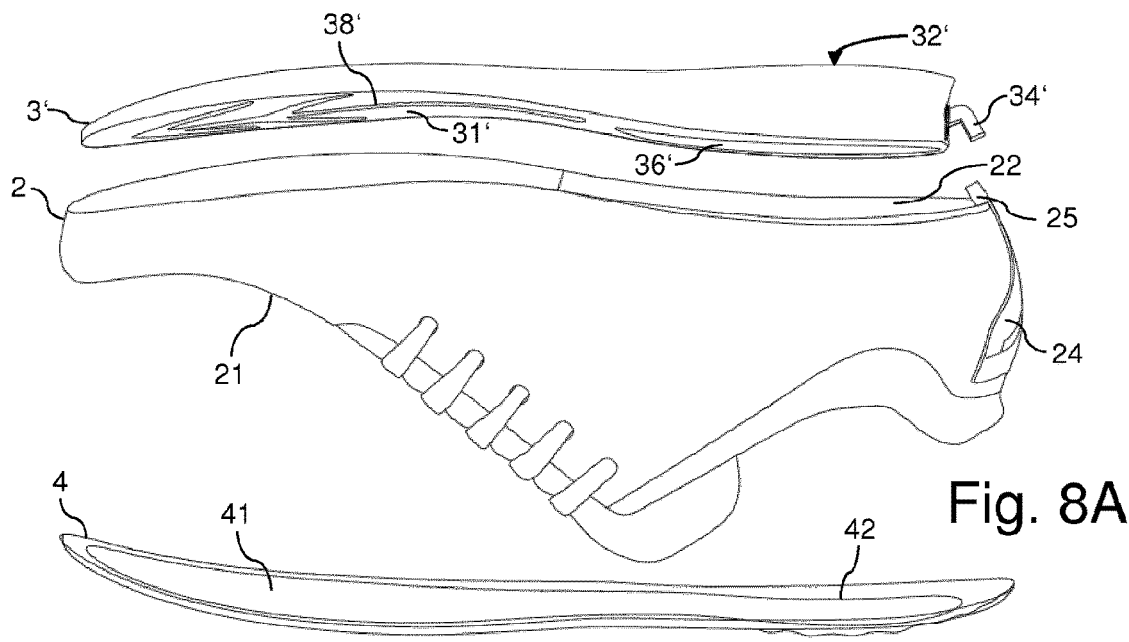
FIG. 8A to 8E are side views of the components and the shoe according to FIG. 6 in the various phases of production according to the second preferred method.
Figure 8B:
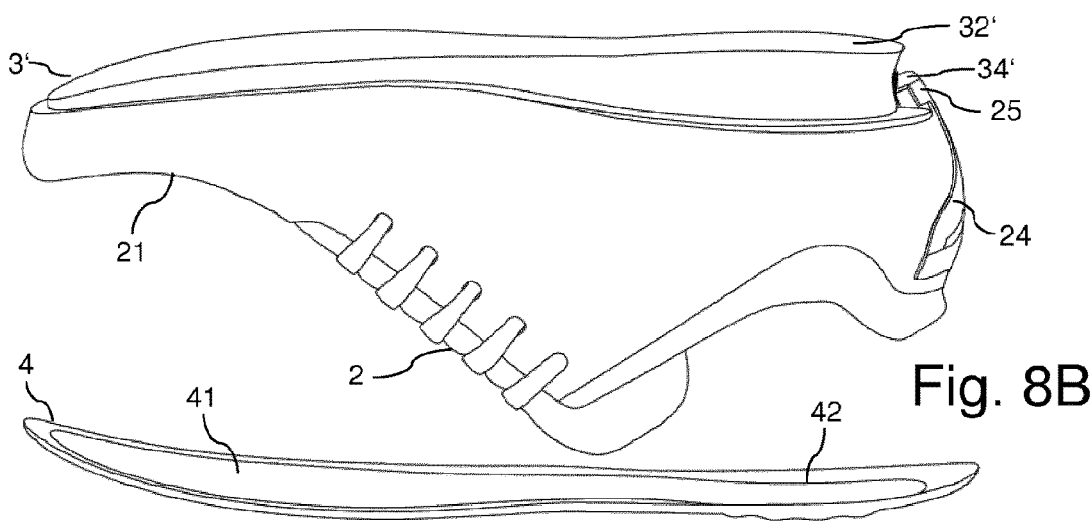

Individual phases of the production method are again shown in FIG. 8A to 8E. As shown in FIG. 8A, the outsole 4 is provided, preferably in a base element (not shown here) of an injection mold. Furthermore, the upper 2 is provided and arranged on a last (not shown here) such that the sole section 22 thereof points upwards. As shown in FIGS. 8A and 8B, the midsole 3' is first positioned on and adhered to the sole section 22 of the upper 2. The upper face 31' of the midsole 3' has a surface having a first surface profile and the recess 36' adjacent to this surface for receiving the at least one bellows of the air pump device as well as recesses for receiving the air-guiding ducts 38'. The lower face of the sole section 22 of the upper 2 has a surface having a second surface profile which is complementary to the first surface profile at least in part such that the complementary surface regions of the second surface profile of the sole section 22 and the first surface profile of the midsole 3' surround the at least one recess 36' and the recesses of the air-guiding ducts 38' on all sides, such that the recesses are closed on all sides after adhering the midsole 3' to the sole section 22 of the upper 2, i.e. no gap remains between the upper face 31' of the midsole 3' and the sole section 22.

When the midsole 3' is adhered to the sole section 22, a connection is simultaneously made between the connecting element 34' and the connecting element 25 of the upper-side part of the air intake duct 24. It is made easier to mount the midsole 3' on the upper 2, including connecting the connecting elements of the air intake duct, in that, as already mentioned, the lower face of the upper is arranged upwards.

Figure 8C:
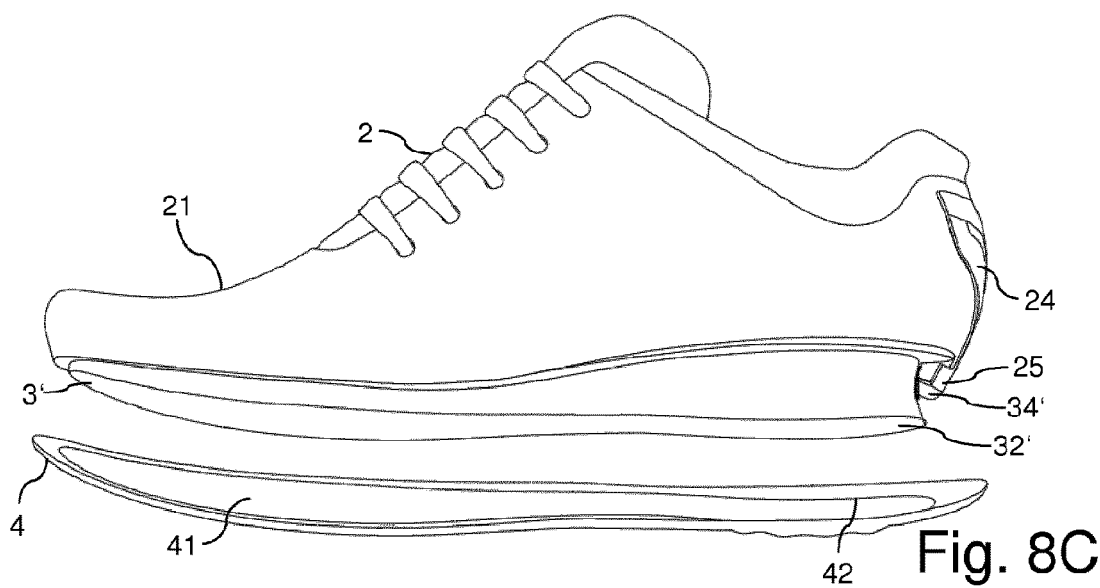
Figure 8D:
Figure 8E:
Figure 9A:
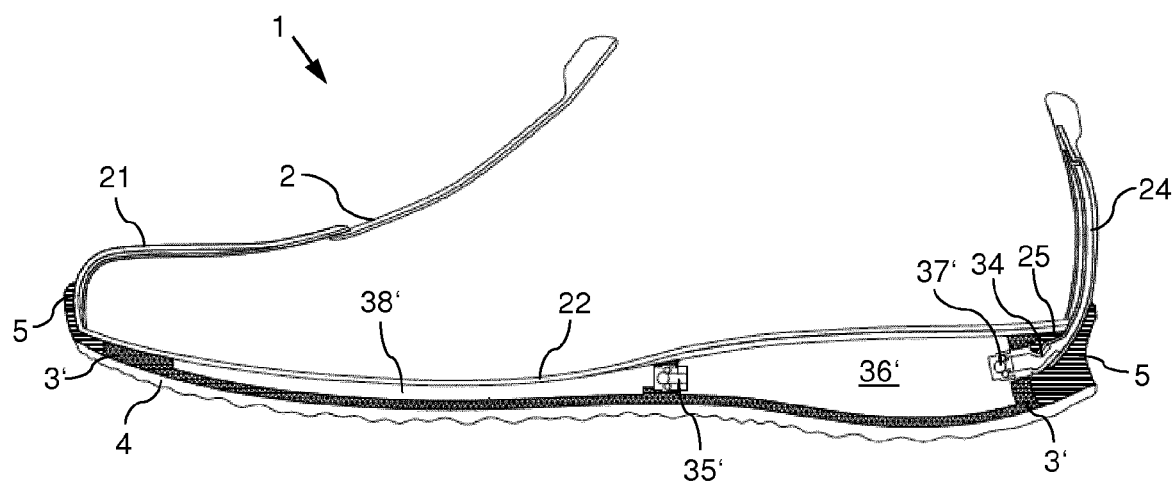
FIG. 9A is a longitudinal sectional view and FIG. 9B is a cross-sectional view of a shoe produced according to the second preferred method shown in FIG. 8A to 8E.
Figure 9B:
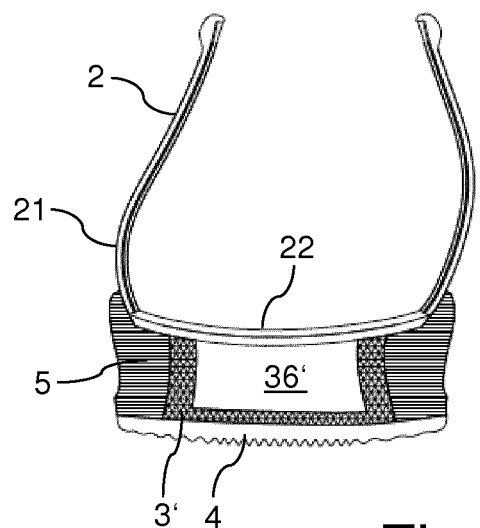

After the midsole 3' has been adhered to the sole section 22 of the upper 2, the last having the clamped upper 2 is rotated such that the lower face 32' of the midsole 3' faces the upper face 41 of the outsole 4. This is shown in FIG. 8C. Subsequently, the lower face 32' of the midsole 3' is placed onto the upper face 41 of the outsole 4 such that it is positioned in the indentation by means of the edge 42. The result is shown in FIG. 8D. Preferably, the connection between the midsole 3' and the outsole 4 is also an adhesive bond, which, however, does not need to be provided over the entire surface. It merely serves to fix the outsole 4 to the midsole 3'. After the upper 2, the midsole 3' and the outsole 4 have been interconnected, as shown in FIG. 8D, an injection mold is closed around the shoe and the plastics material of the edge sole region 5 is then injected such that the surface regions of the upper face 41 of the outsole 4 not covered by the midsole 3', the lateral outer surfaces of the midsole 3' and the regions of the sole section 22 not covered by the midsole 3' and adjacent lateral surface regions of the upper 2 are overmolded with the edge sole region plastic. The result is shown in FIG. 8E.

FIGS. 9A and 9B are again schematic sectional views through a shoe 1 produced according to the production method shown on the basis of FIG. 8A to 8E. The views in FIGS. 9A and 9B correspond to those in FIGS. 4A and 4B, with the following differences. The recess 36' for forming the bellows of the air pump device and the recesses for the air-guiding ducts 38' are open towards the upper face of the midsole 3' here such that they are closed by the sole section 22 of the upper 2. Here, the air-guiding ducts 38' of the midsole 3' directly adjoin the openings in the sole section 22 of the upper 2. In this embodiment, it is preferably provided that the sole section 22 comprises an insole which is reinforced in the heel region above the cavity of the recess 36' which forms the at least one bellows of the air pump device and is designed as a rigid pressure plate which completely covers the recess 36'. For example, the insole of the sole section 22 is covered in this region by a strong cardboard or a rigid plastics plate.

Figure 10:
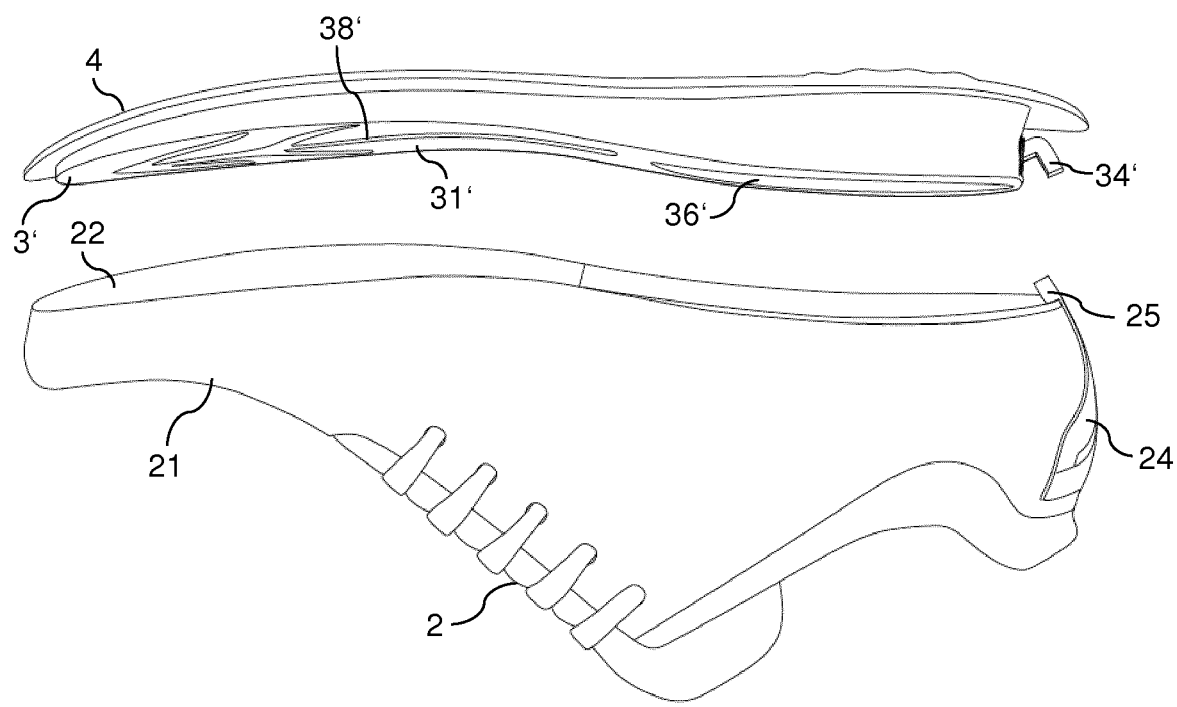
FIG. 10 shows a side view of the upper, midsole and outsole components in the production phase after the midsole and outsole have been connected and before the midsole has been connected to the upper of a shoe produced according to an alternative variant of the second preferred method.

FIG. 10 shows a phase in the production process of a shoe which is produced according to a modification of the method described with reference to FIG. 8A to 8E. While the midsole 3' has first been attached to the sole section 22 of the upper 2 in the production according to FIG. 8A to 8E in order to subsequently attach this combination to the outsole 4, in the embodiment according to FIG. 10 the midsole 3' is first connected to the outsole 4 in order to then fasten this combination to the sole section 22 of the upper 2. FIG. 10 shows the phase in which the midsole 3' is already connected to the outsole 4 and this combination is arranged above an upper 2 pointing upwards together with the sole section 22. Here, the connection between the midsole 3' and the outsole 4 does not need to be a full-surface adhesive bond; it is sufficient to fix the midsole 3' to the outsole 4. After the phase shown in FIG. 10, the adhesive bond is then made between the upper face 31' of the midsole 3' and the upwardly pointing lower face of the sole section 22, with either the upper face 31' of the midsole 3' or the lower face of the sole section 22 or both surfaces having previously been coated with adhesive. The upper face 31' of the midsole 3' and the lower face of the sole section 22 again have complementary surface profiles in the regions to be connected, such that, during adhesion, there is no gap between the upper face 31' of the midsole 3' and the lower face of the sole section 22 that connects the recesses in the midsole 3' to the environment.

FIG. 11A to 11F are schematic perspective views of the components of a shoe in the various phases of its production following a modification of the first embodiment of the method according to the invention described with reference to FIGS. 1 to 4B, but first, in the method according to FIG. 11A to 11F, the midsole 3", the lower face of which comprises recesses, is applied to the outsole 4" provided in a base element 6 of an injection mold and then the upper 2" is mounted on this combination.

Figure 11A:
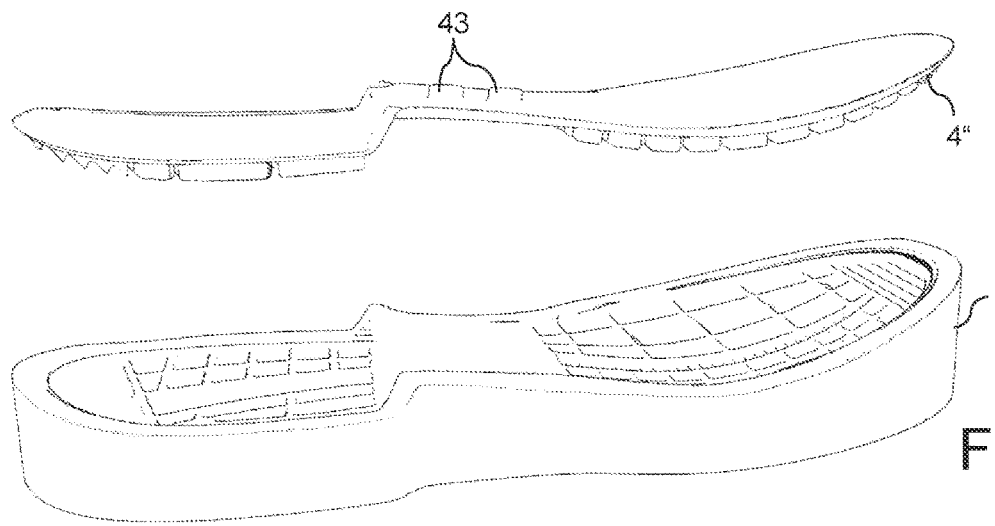
FIG. 11A to 11F are perspective views of the components of a shoe in the various phases of its production according to a third embodiment of the method according to the invention.

FIG. 11A first shows the provision of the outsole 4" by inserting the prefabricated outsole into the base element 6 of an injection mold. In an embodiment that is not shown here, the outsole 4" can also be provided by injection molding in the base element 6 of the injection mold, by the base element 6 being closed at the top during this injection molding by a mold half which corresponds to the profile of the upper face of the outsole 4" to be produced. FIG. 11A also shows that the outsole 4" provided comprises two positioning elements 43 on its upper face. After the outsole 4" is provided in the base element of the injection mold, a prefabricated midsole 3" is placed thereon. The lower face of the midsole 3" comprises positioning elements which are complementary to the positioning elements 43 of the outsole 4", such that it is possible to precisely position the midsole 3" which it is placed on.

Figure 11B:
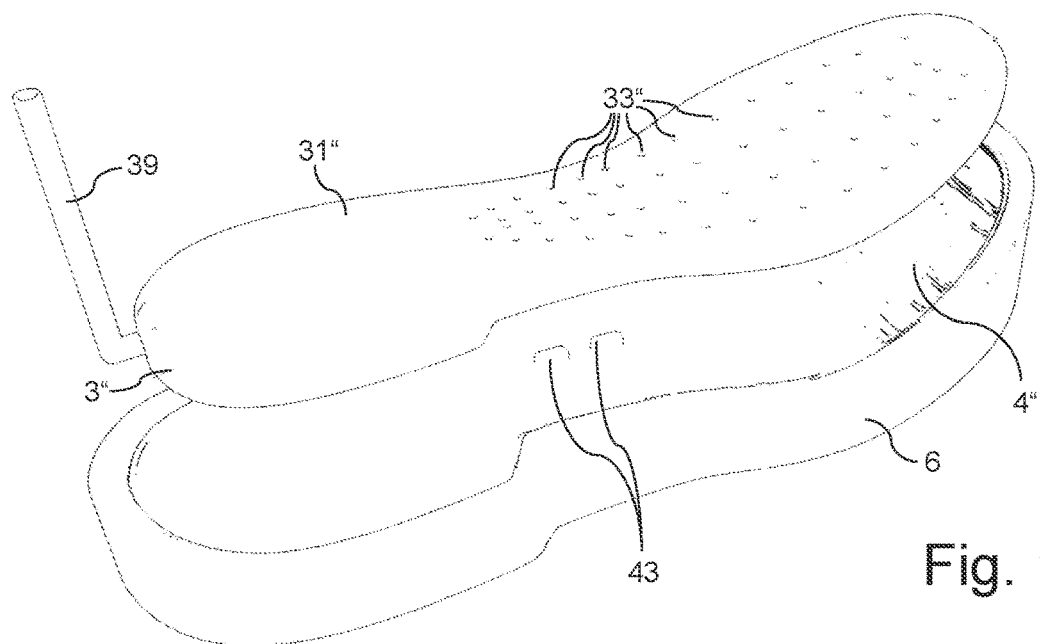
Figure 12:
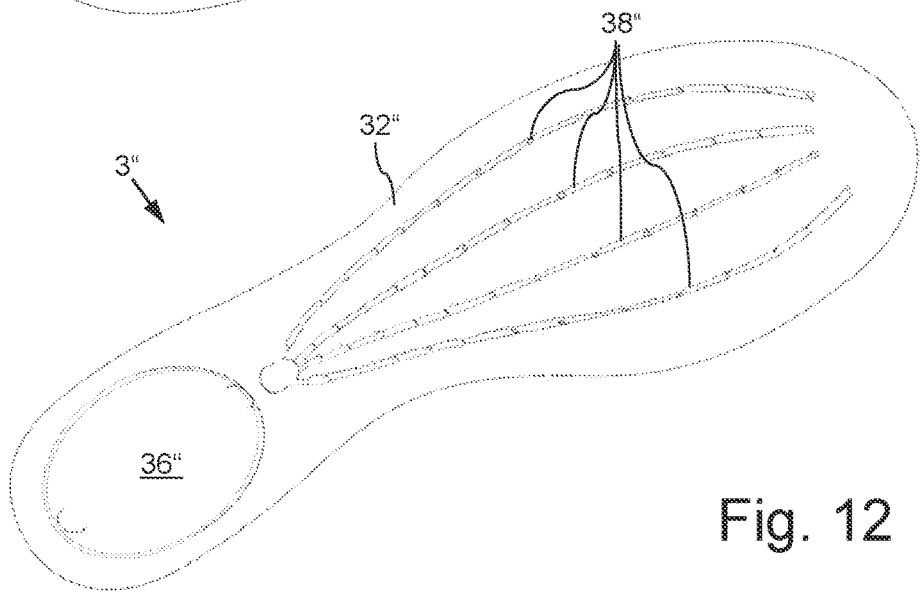
FIG. 12 is a view from below of the midsole as used in the production method shown in FIG. 11A to 11F.

FIG. 12 is a view from below of the midsole 3" shown in FIG. 11B, the recess 36" for forming the cavity of the bellows of the air pump device and the recesses for the air-guiding ducts 38" being visible in particular in FIG. 12. The midsole 3" is also equipped with an air intake duct 39.

Figure 11C:
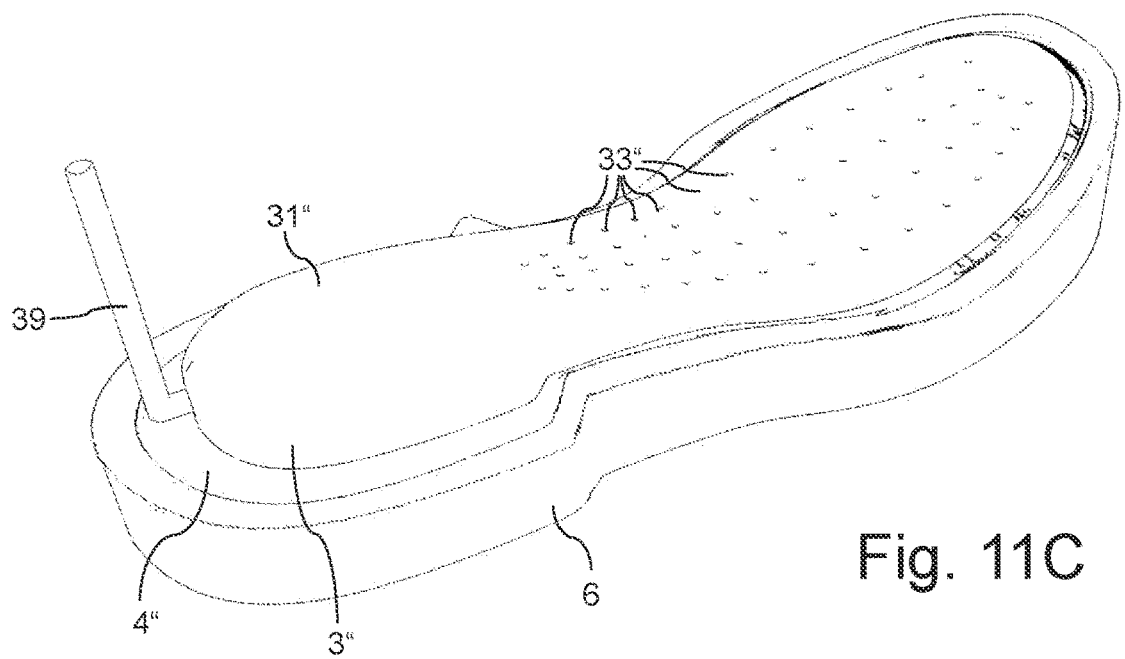
Figure 11D:
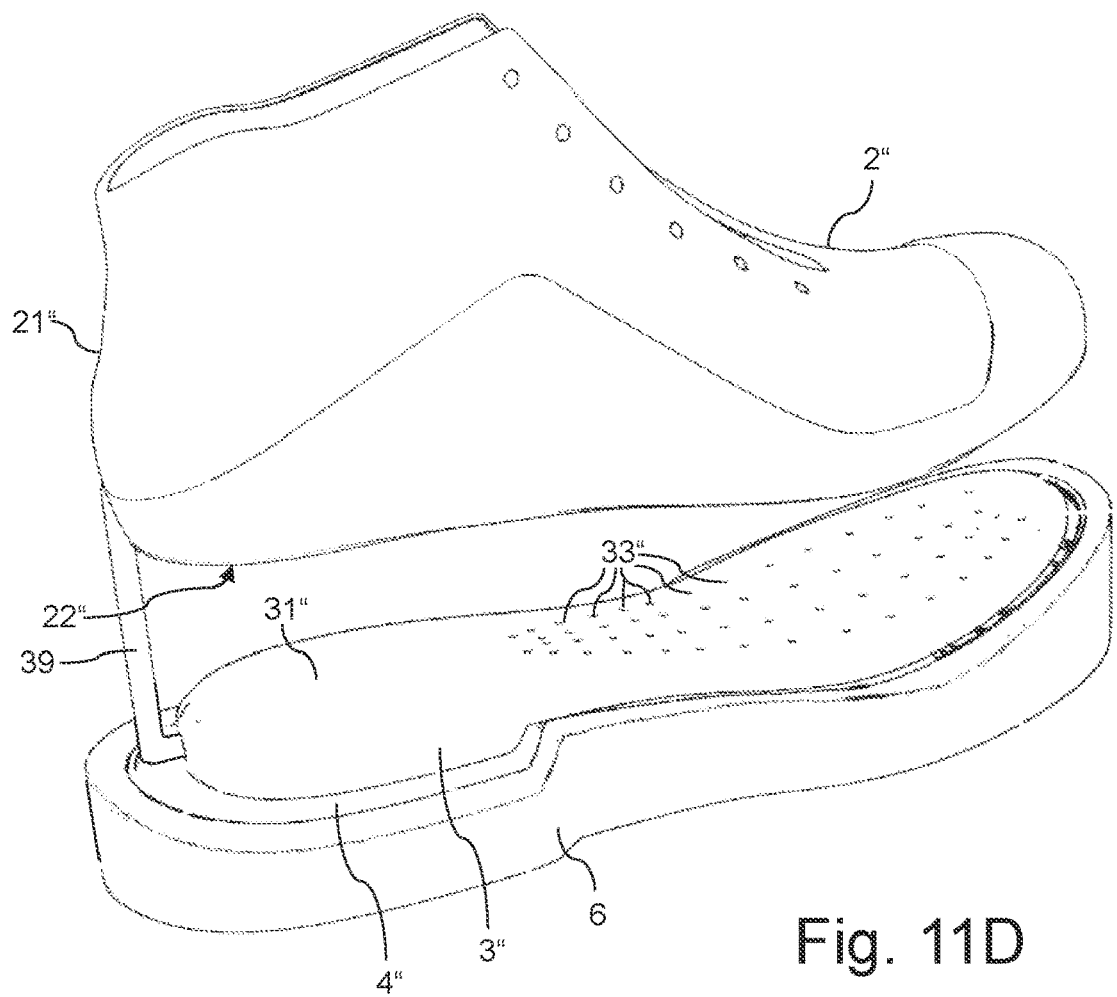
Figure 11E:
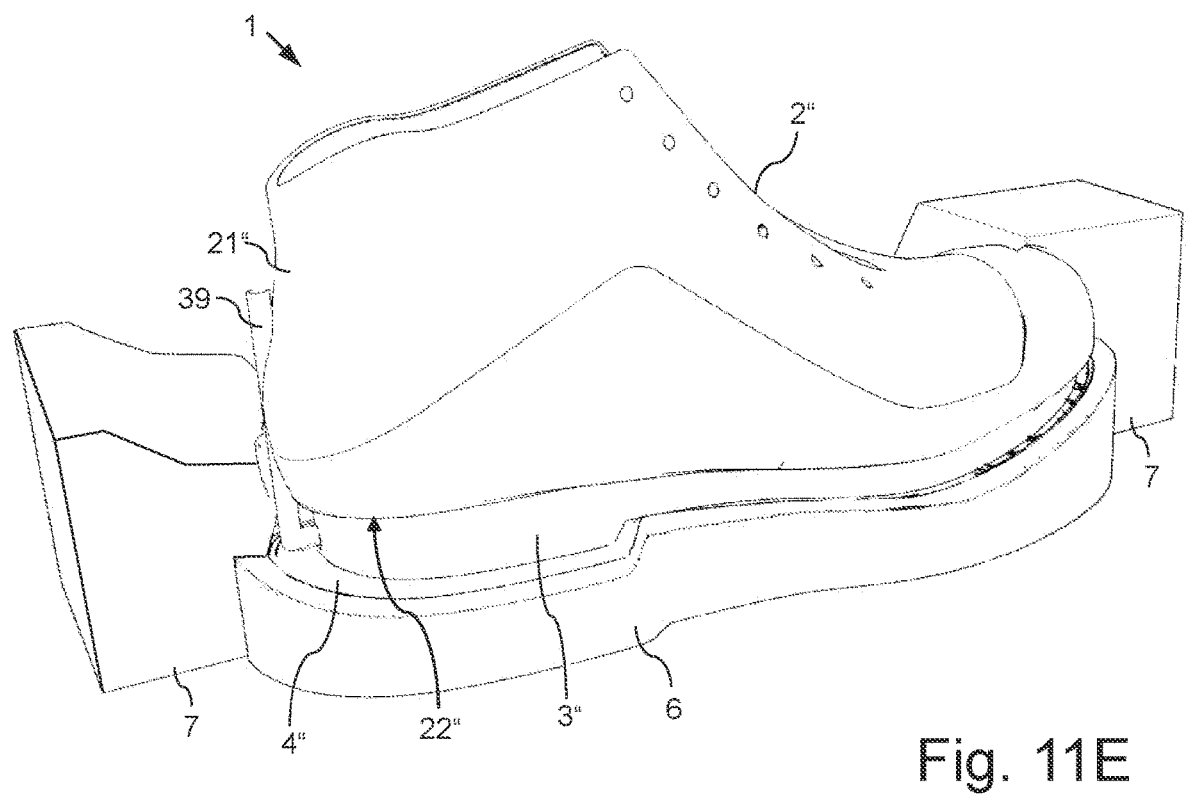
Figure 11F:
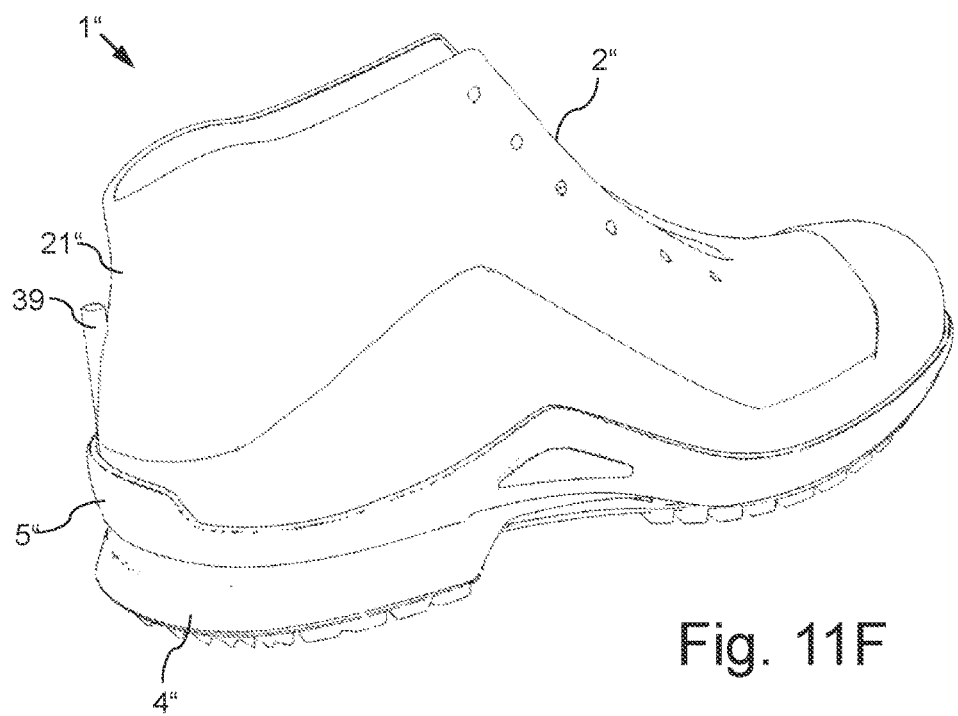

FIG. 11C shows the phase of the production process after positioning the midsole 3" on the midsole 4" lying in the base element 6 of the injection mold. After the midsole 3" has been positioned, as shown in FIG. 11, the pre-assembled upper 2" is placed thereon, the lower face of its sole section 22" being placed on the upper face 31" of the midsole 3". According to FIG. 11E, the injection mold, which is schematically shown here, is then closed by the side parts 7, such that then the surface regions of the upper face of the outsole 4" that are not covered by the midsole 3", the lateral outer surfaces of the midsole 3" having the intake duct 39, and the regions of the lower face of the sole section 22" that are not covered by the midsole 3" and comprise the adjacent lateral surface regions of the upper 2" are overmolded with an edge sole region plastic, in order to interconnect the upper 2", the midsole 3", and the outsole 4". The result of this connection is shown in FIG. 11F.

As already mentioned, the use of the shoe components upper 2, midsole 3, outsole 4 and edge sole region 5 allows the materials used for the components to be adapted to their respective functions. A compressible material (i.e. that can be easily pressed together) having sufficient resilience, for example a PUR foam, is used for the midsole 3. A compressible and resilient PUR foam material is also preferably used for the edge sole region. The materials of the midsole 3 and the edge sole region 5 preferably have a Shore A hardness of between 40 and 60 Shore, preferably of between 45 and 55 Shore. In the embodiments described above, the bellows of the air pump device is preferably formed by the cavity of the recess 36, covered by the lower face of the sole section 22 or the upper face 41 of the outsole 4, without an additional plastics bubble needing to be used. Of course, it is conceivable in alternative embodiments for such a plastics bubble to be inserted into the cavity, which is usually carried out during the pre-assembly of the midsole.

The invention claimed is:

1. A method for producing a shoe, the shoe having an air pump device arranged in the heel region, the air pump device comprising at least one bellows, into which at least one air intake duct opens and to which at least one air-guiding duct which opens into the interior of the shoe is connected, the method comprising:
   providing an upper having an upper material section and a sole section having a lower face, a midsole having an upper face and a lower face, and an outsole having an upper face,
   the upper face of the midsole having surface having a first surface profile and at least one recess bordering the surface of the upper face of the midsole for receiving the at least one bellows of the air pump device, and the lower face of the sole section of the upper having a surface having a second surface profile which is complementary to the first surface profile at least in part such that the complementary surface regions of the second surface profile of the sole section and the first surface profile of the midsole completely surround the at least one recess,
   wherein a horizontal extension of the upper face of the outsole and a horizontal extension of the sole section of the upper are greater than a horizontal extension of the midsole such that the outsole and the upper protrude beyond the outer edge of the midsole on all sides if the midsole is centrally positioned between the outsole and the upper, and
   connecting the upper, the midsole and the outsole by
   applying the midsole centrally to the upper face of the outsole and
   applying the outsole with the applied midsole to the lower face of the sole section of the upper, wherein the complementary surface regions of the first surface profile of the upper face of the midsole and the second surface profile of the lower face of the sole section are adhered such that the at least one recess for receiving the at least one bellows of the air pump device is completely enclosed, and
   then, enclosing the upper, the midsole and the outsole by an injection mold and overmolding the surface regions of the upper face of the outsole not covered by the midsole, the lateral outer surfaces of the midsole and the lower face and adjacent lateral surface regions of the upper with an edge sole region plastic in order to interconnect the outsole, the midsole and the upper by forming an edge sole region.

2. The method of claim 1, wherein the overmolding comprises selecting an injection pressure depending on the material of the midsole such that the cavity formed by the recess for receiving the at least one bellows of the air pump device is not compressed.

3. The method of claim 1, wherein the step of applying the outsole with the applied midsole to the lower face of the sole section of the upper comprises positioning the upper on a last such that the lower face of the sole section points upwards.

4. The method of claim 1, wherein the step of applying the midsole centrally to the upper face of the outsole comprises positioning the midsole using markings or projections on the upper face of the outsole.

5. The method of claim 1, wherein providing the upper, the midsole and the outsole comprises providing an outsole which projects beyond the outer edge of the midsole on all sides such that the distance between the outer edge of the outsole and the outer edge of the midsole is between 5% and 20% of the length of the shoe.

6. The method of claim 1, wherein providing the upper, the midsole and the outsole comprises providing a midsole consisting of a plastics foam having a Shore A hardness of between 40 and 60 Shore.

7. The method of claim 1, wherein providing the upper, the midsole and the outsole comprises providing a midsole is comprising a recess arranged in the heel region for receiving a bellows of the air pump device,
wherein the recess extends horizontally at the sides and at the back of the shoe, by a distance of approximately 1-5% of the length of the shoe from the edge of the midsole,
wherein the bellows are formed by the recess that is covered by the lower face of the sole section and
wherein a section of the at least one air intake duct and a section of the at least one air-guiding duct opening into the interior of the shoe are formed in the midsole.

8. A method for producing a shoe, the shoe having an air pump device arranged in the heel region, the air pump device comprising at least one bellows, into which at least one air intake duct opens and to which at least one air-guiding duct which opens into the interior of the shoe is connected, the method comprising:
providing an upper having an upper material section and a sole section having a lower face, a midsole having an upper face and a lower face, and an outsole having an upper face,
the lower face of the midsole having a surface having a first surface profile and at least one recess bordering the surface of the lower face of the midsole for receiving the at least one bellows of the air pump device, and the upper face of the outsole having a surface having a second surface profile which is complementary to the first surface profile at least in part such that the complementary surface regions of the second surface profile of the outsole and the first surface profile of the midsole completely surround the at least one recess,
wherein a horizontal extension of the upper face of the outsole and a horizontal extension of the sole section of the upper are greater than a horizontal extension of the midsole such that the outsole and the upper protrude beyond the outer edge of the midsole on all sides if the midsole is centrally positioned between the outsole and the upper,
connecting the upper, the midsole and the outsole by
applying the midsole centrally to the upper face of the outsole, wherein the complementary surface regions of the first surface profile of the lower face of the midsole and the second surface profile of the upper face of the outsole are adhered such that the at least one recess for receiving the at least one bellows of the air pump device is completely enclosed, and
applying the outsole with the applied midsole to the lower face of the sole section of the upper, and
then, enclosing the upper, the midsole and the outsole by an injection mold and overmolding the surface regions of the upper face of the outsole not covered by the midsole, the lateral outer surfaces of the midsole and the lower face and adjacent lateral surface regions of the upper with an edge sole region plastic in order to interconnect the outsole, the midsole and the upper by forming an edge sole region.

9. The method of claim 8, wherein the overmolding comprises selecting an injection pressure depending on the material of the midsole such that the cavity formed by the recess for receiving the at least one bellows of the air pump device is not compressed.

10. The method of claim 8, wherein the step of applying the outsole with the applied midsole to the lower face of the sole section of the upper comprises positioning the upper on a last such that the lower face of the sole section points upwards.

11. The method of claim 8, wherein the step of applying the midsole centrally to the upper face of the outsole comprises positioning the midsole using markings or projections on the upper face of the outsole.

12. The method of claim 8, wherein providing the upper, the midsole and the outsole comprises providing an outsole which projects beyond the outer edge of the midsole on all sides such that the distance between the outer edge of the outsole and the outer edge of the midsole is between 5% and 20% of the length of the shoe.

13. The method of claim 8, wherein providing the upper, the midsole and the outsole comprises providing a midsole consisting of a plastics foam having a Shore A hardness of between 40 and 60 Shore.

14. The method of claim 8, wherein providing the upper, the midsole and the outsole comprises providing a midsole comprising a recess arranged in the heel region for receiving a bellows of the air pump device,
wherein the recess extends horizontally at the sides and at the back of the shoe, by a distance of approximately 1-5% of the length of the shoe from the edge of the midsole,
wherein the bellows are formed by the recess that is covered by the upper face of the outsole and
wherein a section of the at least one air intake duct and a section of the at least one air-guiding duct opening into the interior of the shoe are formed in the midsole.

15. A method for producing a shoe, the shoe having an air pump device arranged in the heel region, the air pump device comprising at least one bellows, into which at least one air intake duct opens and to which at least one air-guiding duct which opens into the interior of the shoe is connected, the method comprising:
providing an upper having an upper material section and a sole section having a lower face, a midsole having an upper face and a lower face, and an outsole having an upper face,
the upper face of the midsole having a surface having a first surface profile and at least one recess bordering the surface of the upper face of the midsole for receiving the at least one bellows of the air pump device, and the lower face of the sole section of the upper having a surface having a second surface profile which is complementary to the first surface profile at least in part such that the complementary surface regions of the second surface profile of the sole section and the first surface profile of the midsole completely surround the at least one recess, wherein a horizontal extension of the upper face of the outsole and a horizontal extension of the sole section of the upper are greater than a horizontal extension of the midsole such that the outsole and the upper protrude beyond the outer edge of the midsole on all sides if the midsole is centrally positioned between the outsole and the upper, connecting the upper, the midsole and the outsole by applying the midsole centrally to the lower face of the sole section of the upper, wherein the complementary surface regions of the first surface profile of the upper face of the midsole and the second surface profile of the lower face of the sole section are adhered such that the at least one recess for receiving the at least one bellows of the air pump device is completely enclosed, and pressing the upper with the applied midsole onto the upper face of the outsole, the outsole previously being provided in a base element of an injection mold, and then, enclosing the upper, the midsole and the outsole by an injection mold and overmolding the surface regions of the upper face of the outsole not covered by the midsole, the lateral outer surfaces of the midsole and the lower face and adjacent lateral surface regions of the upper with an edge sole region plastic in order to interconnect the outsole, the midsole and the upper by forming an edge sole region.

16. The method of claim 15, wherein the overmolding comprises selecting an injection pressure depending on the material of the midsole such that the cavity formed by the recess for receiving the at least one bellows of the air pump device is not compressed.

17. The method of claim 15, wherein the step of applying the midsole centrally to the lower face of the sole section of the upper comprises positioning the upper on a last such that the lower face of the sole section points upwards.

18. The method of claim 15, wherein the step of applying the midsole centrally to the lower face of the sole section of the upper comprises positioning the midsole using markings or projections on the lower face of the sole section of the upper.

19. The method of claim 15, wherein providing the upper, the midsole and the outsole comprises providing an upper which has a first air intake duct extending from the sole section along its upper material section comprising an air intake opening spaced apart from the sole section and a first connecting element arranged on the sole section, and a midsole which has, on its upper face, a second connecting element connected to a second air intake duct of the air pump device, and the step of applying the midsole centrally to the lower face of the sole section of the upper comprises interconnecting the first and the second connecting element in order to connect the second air intake duct of the midsole to the first air intake duct of the upper.

20. The method of claim 13, wherein providing the upper, the midsole and the outsole comprises providing an upper which has a first air intake duct extending along its heel region.

21. The method of claim 15, wherein providing the upper, the midsole and the outsole comprises providing an upper having a sole section comprising an insole which is reinforced in the heel region above the at least one recess containing the at least one bellows of the air pump device and is designed as a rigid pressure plate which covers the at least one recess.

22. The method of claim 15, wherein providing the upper, the midsole and the outsole comprises providing an outsole which projects beyond the outer edge of the midsole on all sides such that the distance between the outer edge of the outsole and the outer edge of the midsole is between 5% and 20% of the length of the shoe.

23. The method of claim 15, wherein providing the upper, the midsole and the outsole comprises providing a midsole consisting of a plastics foam having a Shore A hardness of between 40 and 60 Shore.

24. The method according to claim 15, wherein providing the upper, the midsole and the outsole comprises providing a midsole comprising a recess arranged in the heel region for receiving a bellows of the air pump device, wherein the recess extends horizontally at the sides and at the back of the shoe, by a distance of approximately 1-5% of the length of the shoe from the edge of the midsole, wherein the bellows are formed by the recess that is covered by the lower face of the sole section and wherein a section of the at least one air intake duct and a section of the at least one air-guiding duct opening into the interior of the shoe are formed in the midsole.

25. A method for producing a shoe, the shoe having an air pump device arranged in the heel region, the air pump device comprising at least one bellows, into which at least one air intake duct opens and to which at least one air-guiding duct which opens into the interior of the shoe is connected, the method comprising:

providing an upper having an upper material section and a sole section having a lower face, a midsole having an upper face and a lower face, and an outsole having an upper face, the lower face of the midsole having a surface having a first surface profile and at least one recess bordering the surface of the lower face of the midsole for receiving the at least one bellows of the air pump device, and the upper face of the outsole having a surface having a second surface profile which is complementary to the first surface profile at least in part such that the complementary surface regions of the second surface profile of the outsole and the first surface profile of the midsole completely surround the at least one recess, wherein a horizontal extension of the upper face of the outsole and a horizontal extension of the sole section of the upper are greater than a horizontal extension of the midsole such that the outsole and the upper protrude beyond the outer edge of the midsole on all sides if the midsole is centrally positioned between the outsole and the upper, connecting the upper, the midsole and the outsole by applying the midsole centrally to the lower face of the sole section of the upper, and pressing the upper having the applied midsole onto the upper face of the outsole, the outsole previously being provided in a base element of an injection mold, wherein the complementary surface regions of the first surface profile of the lower face of the midsole and the second surface profile of the upper face of the outsole are adhered such that the at least one recess for receiving the at least one bellows of the air pump device is completely enclosed, and then, enclosing the upper, the midsole and the outsole are by an injection mold and overmolding the surface regions of the upper face of the outsole not covered by the midsole, the lateral outer surfaces of the midsole and the lower face and adjacent lateral surface regions of the upper with an edge sole region plastic in order to interconnect the outsole, the midsole and the upper by forming an edge sole region.

26. The method of claim 25, wherein the overmolding comprises selecting an injection pressure depending on the material of the midsole such that the cavity formed by the recess for receiving the at least one bellows of the air pump device is not compressed.

27. The method of claim 26, wherein the step of applying the midsole centrally to the lower face of the sole section of the upper comprises positioning the upper on a last such that the lower face of the sole section points upwards.

28. The method of claim 25, wherein the step of applying the midsole centrally to the lower face of the sole section of the upper comprises positioning the midsole using markings or projections on the upper face of the outsole.

29. The method of claim 25, wherein providing the upper, the midsole and the outsole comprises providing
an upper which has a first air intake duct extending from the sole section along its upper material section comprising an air intake opening spaced apart from the sole section and a first connecting element arranged on the sole section, and
a midsole which has, on its upper face, a second connecting element connected to a second air intake duct of the air pump device, and
the step of applying the midsole centrally to the lower face of the sole section of the upper comprises interconnecting; the first and the second connecting element in order to connect the second air intake duct of the midsole to the first air intake duct of the upper.

30. The method of claim 29, wherein providing the upper, the midsole and the outsole comprises providing an upper which has a first air intake duct extending along its heel region.

31. The method of claim 25, wherein providing the upper, the midsole and the outsole comprises providing the outsole in the base element of the injection mold by producing the outsole in the base element by injection molding or casting.

32. The method of claim 25, wherein providing the upper, the midsole and the outsole comprises providing an outsole which projects beyond the outer edge of the midsole on all sides such that the distance between the outer edge of the outsole and the outer edge of the midsole is between 5% and 20% of the length of the shoe.

33. The method of claim 25, wherein providing the upper, the midsole and the outsole comprises providing a midsole consisting of a plastics foam having a Shore A hardness of between 40 and 60 Shore.

34. The method of claim 25, wherein providing the upper, the midsole and the outsole comprises providing a midsole comprising a recess arranged in the heel region for receiving a bellows of the air pump device,
wherein the recess extends horizontally at the sides and at the back of the shoe, by a distance of approximately 1-5% of the length of the shoe from the edge of the midsole,
wherein the bellows are formed by the recess that is covered by the upper face of the outsole and
wherein a section of the at least one air intake duct and a section of the at least one air-guiding duct opening into the interior of the shoe are formed in the midsole.

* * * * *